(No Model.) 8 Sheets—Sheet 1.

J. W. HUSSEY & E. WOODWARD.
MACHINE FOR VARNISHING AND POLISHING MOLDINGS.

No. 425,034. Patented Apr. 8, 1890.

Witnesses
Geo. S. Lee
Matthew M. Blunt

Inventors
John W. Hussey
Erastus Woodward
Per Frank G. Parker Atty (No Model.) 8 Sheets—Sheet 2.

J. W. HUSSEY & E. WOODWARD.
MACHINE FOR VARNISHING AND POLISHING MOLDINGS.

No. 425,034. Patented Apr. 8, 1890.

(No Model.) 8 Sheets—Sheet 3.
J. W. HUSSEY & E. WOODWARD.
MACHINE FOR VARNISHING AND POLISHING MOLDINGS.
No. 425,034. Patented Apr. 8, 1890.

(No Model.) 8 Sheets—Sheet 4.

J. W. HUSSEY & E. WOODWARD.
MACHINE FOR VARNISHING AND POLISHING MOLDINGS.

No. 425,034. Patented Apr. 8, 1890.

WITNESSES.
Geo. S. Lee.
Matthew M. Blunt.

INVENTORS.
John W. Hussey
Erastus Woodward
Per Frank G. Parker Atty.

THE NORRIS PETERS CO., PHOTO-LITHO., WASHINGTON, D. C.

(No Model.) 8 Sheets—Sheet 6.

J. W. HUSSEY & E. WOODWARD.
MACHINE FOR VARNISHING AND POLISHING MOLDINGS.

No. 425,034. Patented Apr. 8, 1890.

WITNESSES.
Geo. S. Lee
Matthew M. Blunt

INVENTORS.
John W. Hussey
Erastus Woodward
per Frank G. Parker atty (No Model.) 8 Sheets—Sheet 8.

J. W. HUSSEY & E. WOODWARD.
MACHINE FOR VARNISHING AND POLISHING MOLDINGS.

No. 425,034. Patented Apr. 8, 1890.

WITNESSES
Geo. S. Lee.
Matthew M. Blunt

INVENTORS
John W. Hussey
Erastus Woodward
Per Frank G. Parker atty

UNITED STATES PATENT OFFICE.

JOHN W. HUSSEY, OF BROOKLYN, NEW YORK, AND ERASTUS WOODWARD, OF SOMERVILLE, MASSACHUSETTS.

MACHINE FOR VARNISHING AND POLISHING MOLDINGS.

SPECIFICATION forming part of Letters Patent No. 425,034, dated April 8, 1890.

Application filed May 22, 1889. Serial No. 311,735. (No model.)

*To all whom it may concern:*

Be it known that we, JOHN W. HUSSEY, of Brooklyn, in the county of Kings and State of New York, and ERASTUS WOODWARD, of Somerville, in the county of Middlesex and State of Massachusetts, have invented certain new and useful Improvements in Machines for Varnishing and Polishing Moldings, of which the following, taken in connection with the accompanying drawings, is a specification.

The object of our invention is to construct and arrange in a single organized machine devices by which strip-moldings may be varnished, oiled, and polished in a rapid, economical, and superior manner. This object we accomplish by the mechanism shown in the accompanying drawings, in which—

Figure 1:
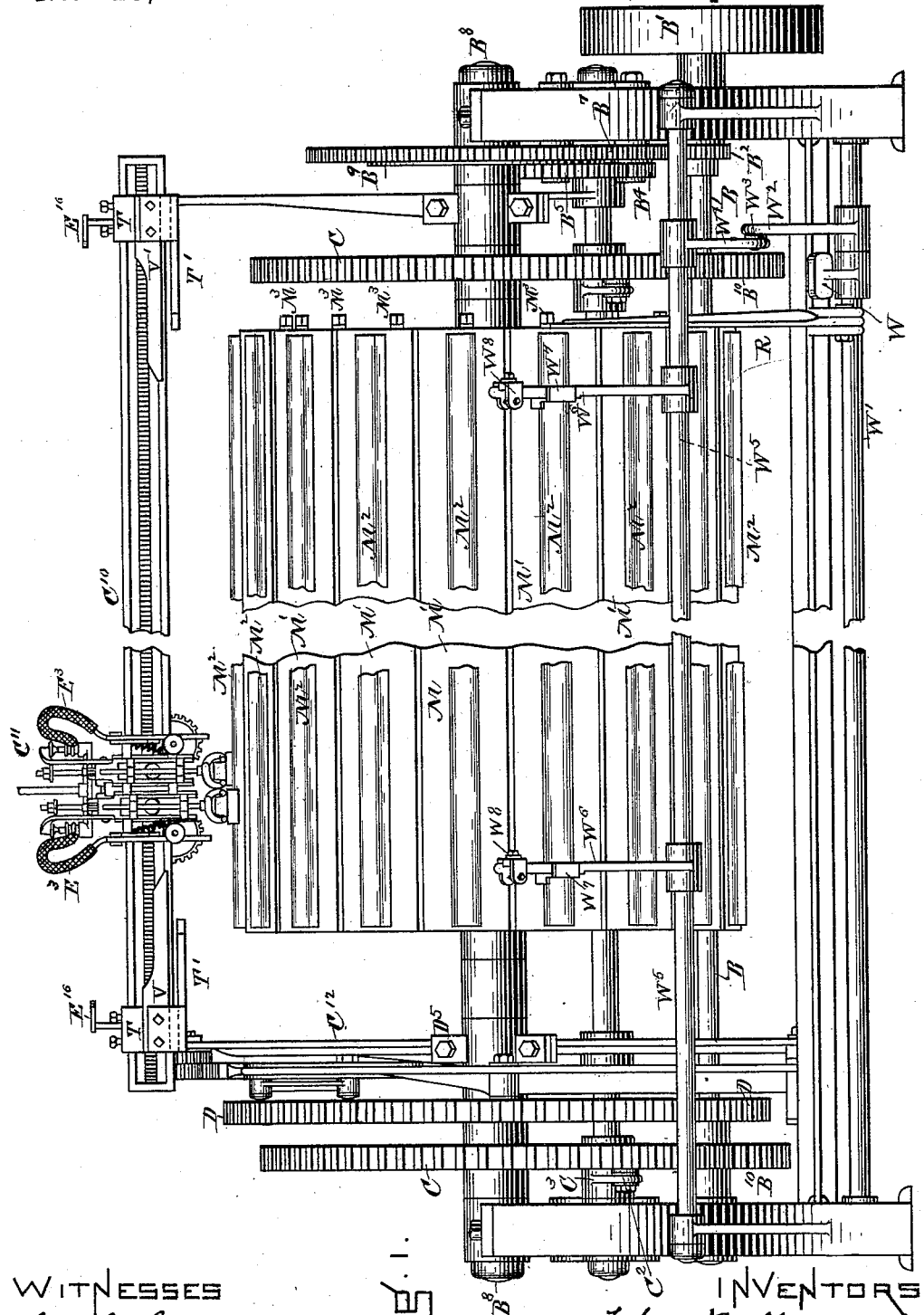
Figure 2:
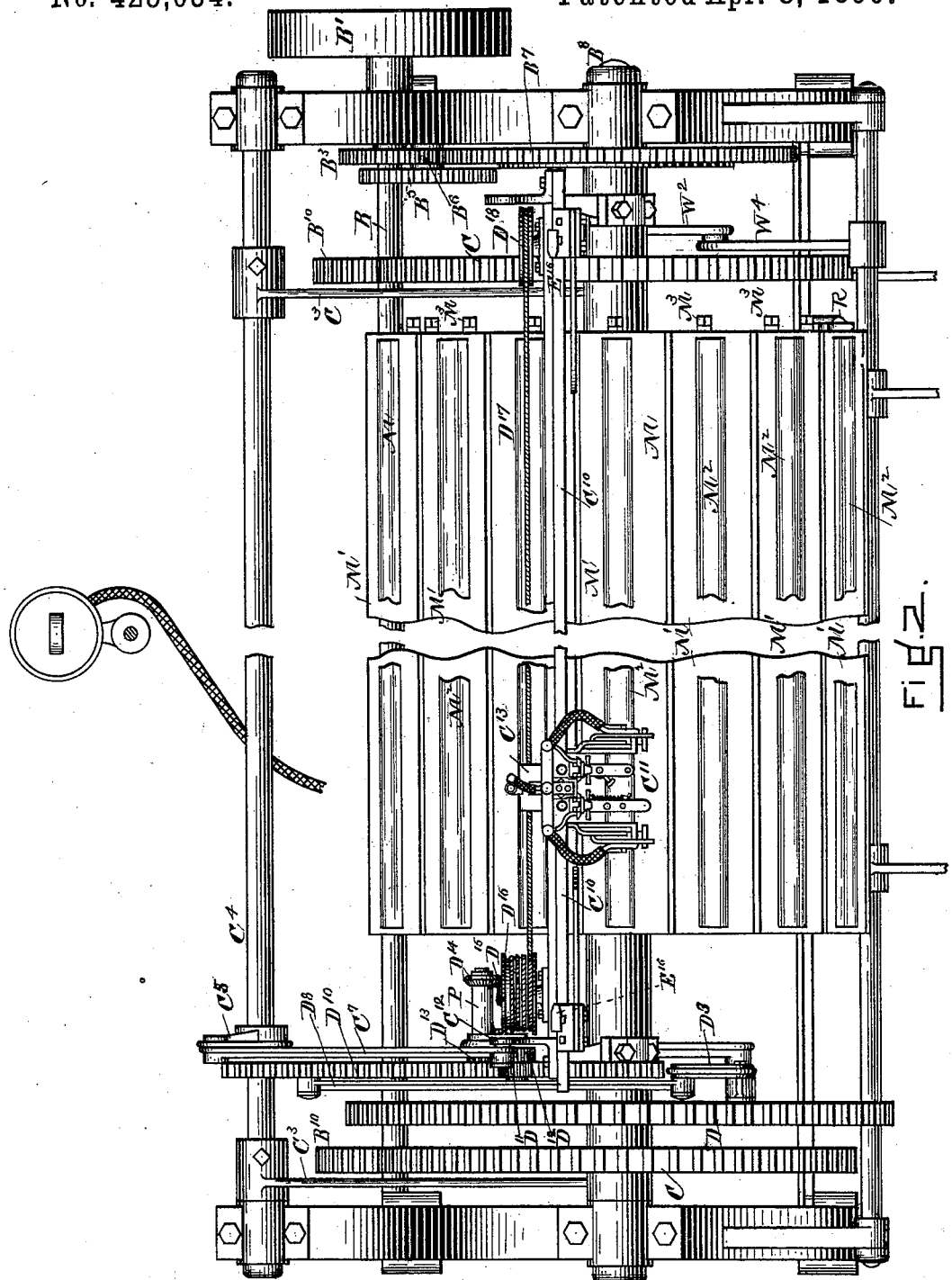
Figure 3:
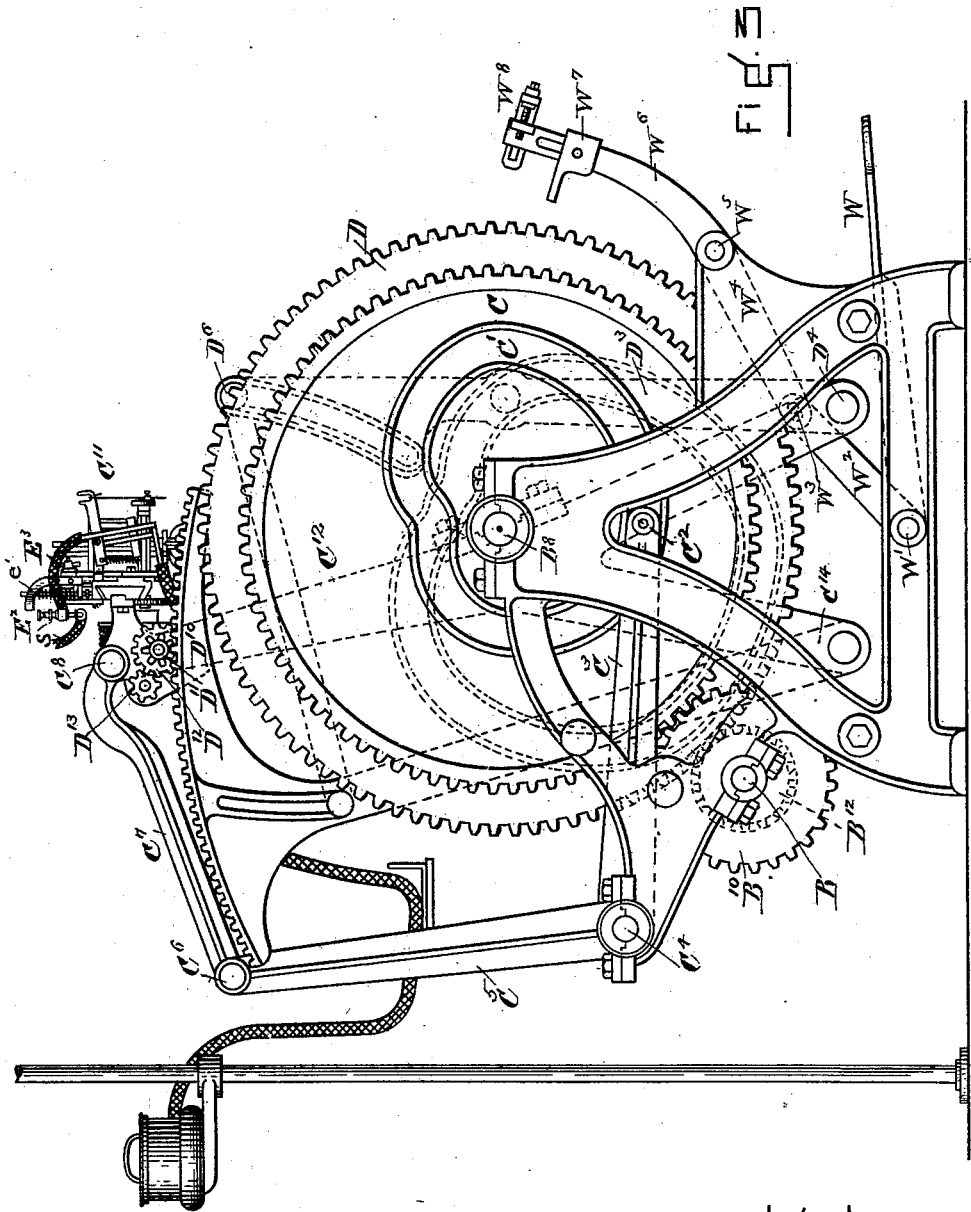
Figure 4:
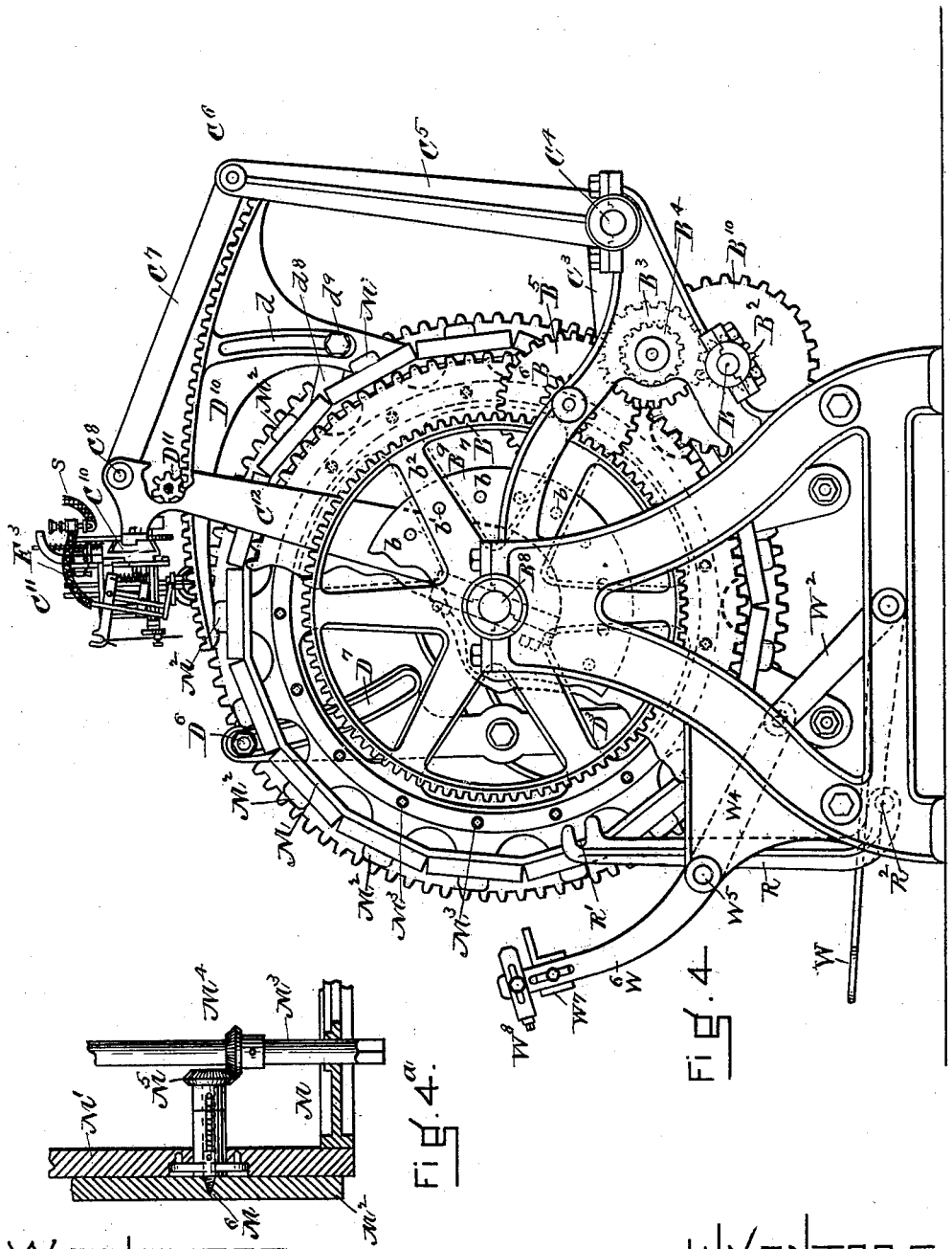
Figure 5:
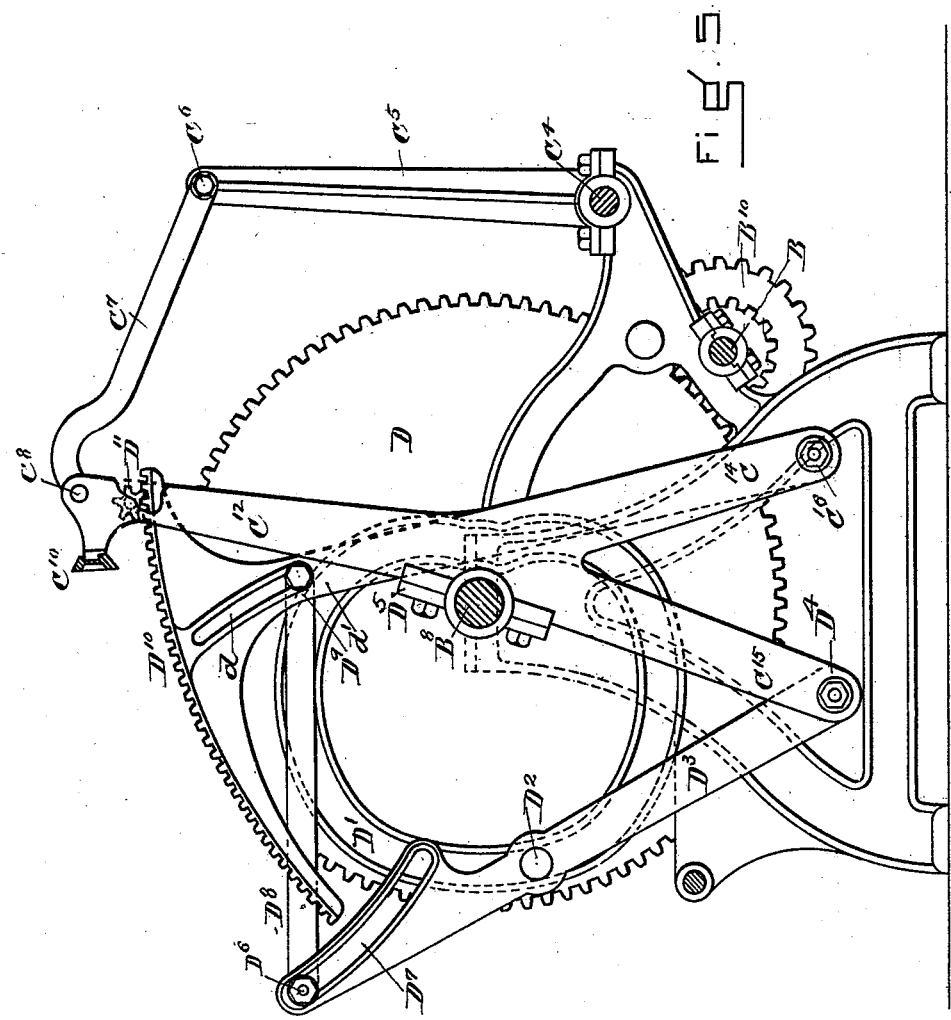
Figure 6:
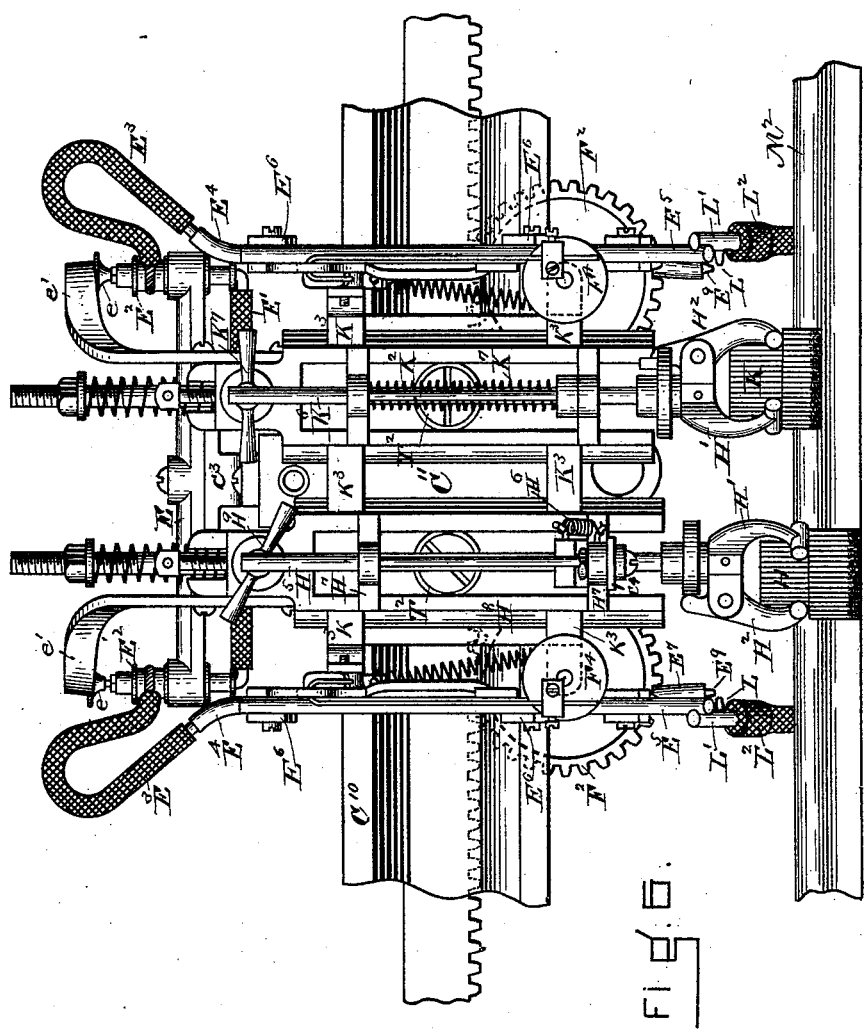
Figure 7:
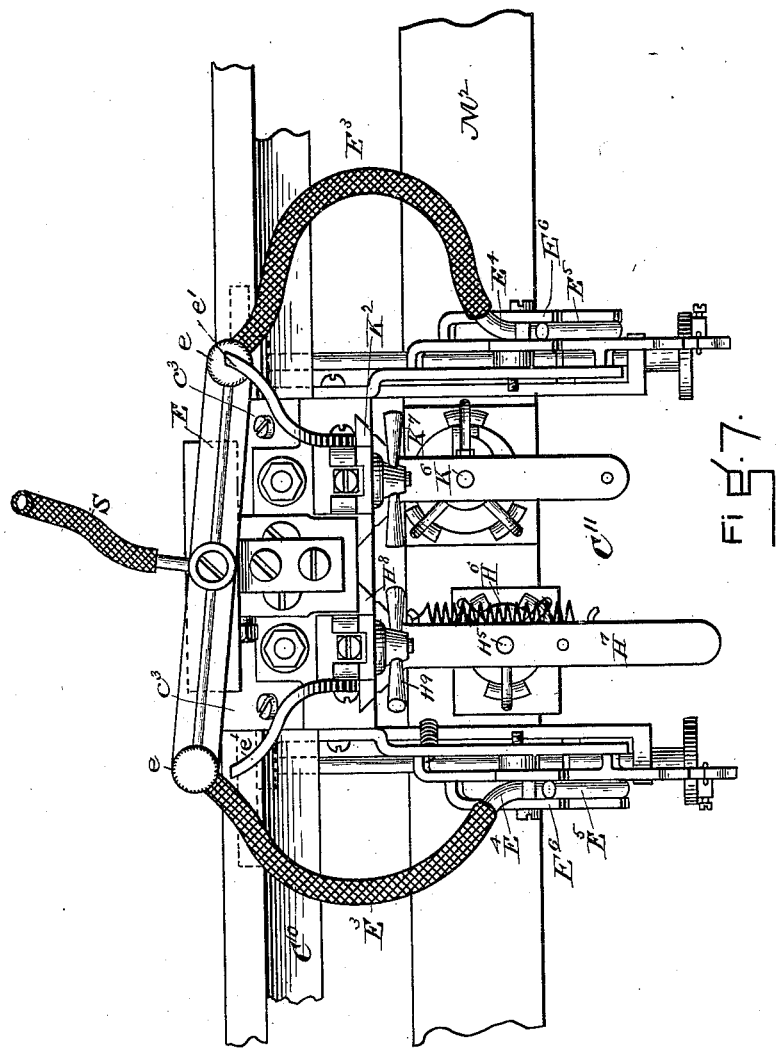
Figure 8:
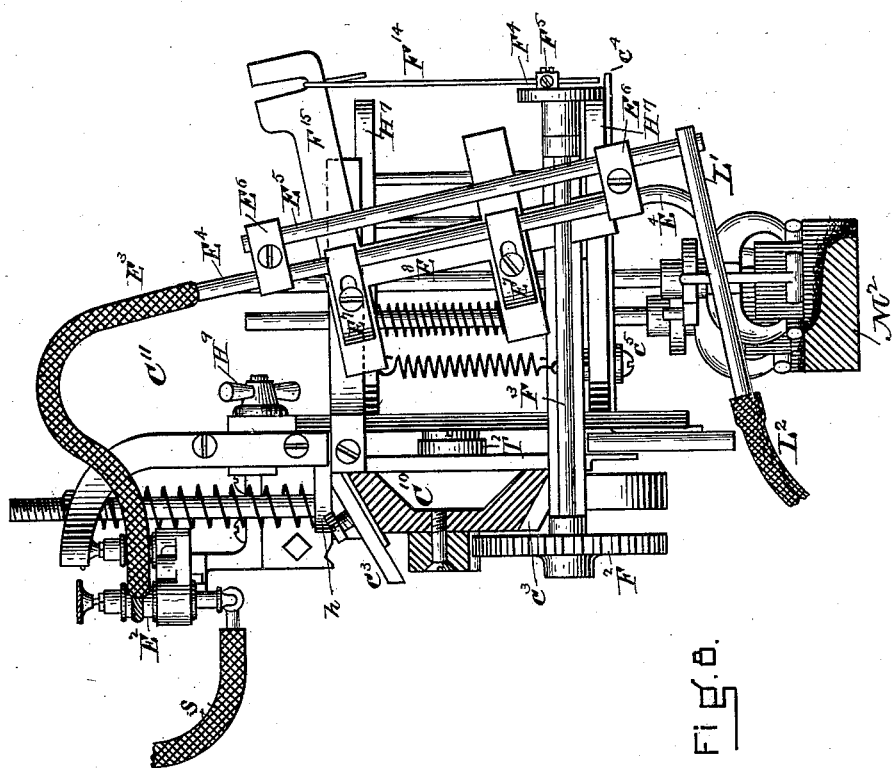

Figure 1 is an elevation of our machine, it being represented as broken in the middle of its length, so that it may be presented (in a shortened view) on a large scale. Fig. 2 is a plan of the same. Fig. 3 is an elevation of the left end as represented in Figs. 1 and 2. Fig. 4 is an elevation of the right end as represented in Figs. 1 and 2. Fig. $4^a$ is a detail shown in an enlarged view. Fig. 5 is a section showing in elevation one of the cams and the connected levers and a segment-gear operated by the cam, the view being taken from the opposite end from which Fig. 3 was taken. Fig. 6 is a front elevation, on an enlarged scale, showing that part of my machine that supplies the varnish, oil, &c., to the surface to be polished and does the polishing. Fig. 7 is a plan of the parts shown in front elevation in Fig. 6 and on the same scale. Fig. 8 is an end elevation of the parts shown in front elevation in Fig. 6 and on the same scale.

In general terms our machine consists of a large cylinder of a length exceeding somewhat the length of the strips of molding to be polished and having as many flat sides or facets as may be desired for attaching the strips of molding to be worked upon. In the machine illustrated we have seventeen facets, and consequently may have attached that number of strips of moldings to the cylinder at one time. As this cylinder slowly revolves, a carriage having connected to it tubes for delivering the polishing-fluid and polishing tools or rubbers traverses lengthwise of the cylinder, the motion of the carriage being such that it will traverse the whole length of the molding-strip, while the cylinder is making that part of a rotation that corresponds to three-fourths of the distance that one of the moldings is from another. Then the carriage has a relative motion opposite to that of the cylinder that takes it to the next molding, and so on until all of the moldings on the cylinder have been treated.

In the drawings, Figs. 1, 2, and 4, M represents a large revolving cylinder which has seventeen facets M' M', each of which is intended to hold a strip of molding $M^2$. The several strips of molding are held to their respective facet by the following-described means.

$M^3 M^3$, Fig. 4, represent shafts passing longitudinally through the cylinder M, there being one of these shafts for each facet. Each of the shafts $M^3$ (see Fig. $4^a$) has upon it a number of beveled gears like $M^4$. Each of the gears $M^4$ engages with a gear $M^5$, which is connected to a gimlet-pointed screw $M^6$ in the facet M'. The screws $M^6$ are so arranged that they have a free longitudinal motion in relation to the housing of the gear $M^5$, but it must revolve with the gear $M^5$, so that by turning the shaft $M^3$ the screw may be made to enter the back of the molding $M^2$ on the facet M', and thus hold it firmly in place. By turning the shaft $M^3$ backward the screw $M^6$ may be withdrawn from the molding $M^2$, and thus allow it to be removed.

A rotary motion is given to the cylinder M by the following means: B, Figs. 1, 2, and 3, is the main driving-shaft, which has upon it a driving-pulley B'. (See Figs. 1 and 2.) Motion is communicated from the shaft B to the shaft $B^8$ of the cylinder M by means of the pinion $B^2$ on the shaft B, (see Figs. 1 and 4,) which engages with the gear $B^3$. The gear $B^3$ has connected to it a pinion $B^4$, which engages with the gear $B^5$, and this gear $B^5$ has connected to it a pinion $B^6$, which engages with the gear $B^7$ on the shaft $B^8$ of the cylinder M.

The above-described gears and pinions are so proportioned that the cylinder M will revolve but once while the main shaft B revolves fifty-one times.

The gear $B^7$ (see Figs. 1 and 4) is loose on the shaft $B^8$, but is put in working connection with it by means of the disk $B^9$. This disk $B^9$ is rigidly attached to the shaft $B^8$ or to the cylinder M, so that the cylinder M must revolve when the disk $B^9$ revolves. The disk $B^9$ is provided with a series of holes $b\ b$, by means of which and a pin at $b'$ it can be connected to one of the spokes $b^2$ of the gear-wheel $B^7$. By withdrawing the pin at $b'$ the cylinder M may be turned (by hand) independently of the other parts of the machine. This is convenient when the operators are removing the finished moldings or placing new moldings on the cylinder, the manner of doing which will be hereinafter explained.

$C^{11}$, Figs. 1, 2, and 3, represents a device which is made to traverse over the length of the molding to be polished. This device is designated in a general way by $C^{11}$ in Figs. 1, 2, and 3; but in Figs. 6, 7, and 8 it is shown in very much enlarged views and its several parts are designated by letters. In fact, all of the parts shown in Figs. 6, 7, and 8 are attached directly to the carriage $C^{11}$ and move with it, except the rail $C^{10}$, upon which the carriage moves. The rail $C^{10}$ is also shown in Figs. 1, 2, and 3.

The carriage $C^{11}$ has connected to it the varnish-distributing and the rubbing or polishing devices, the construction and operation of which will be explained after its actuating mechanism and its movements in relation to the other parts of the machine have been set forth, which we will now proceed to do.

As the rotation of the cylinder M, which carries the moldings, is continuous, it is evident that the carriage $C^{11}$ must have a compound motion—that is, one in the direction of the length of the cylinder M and one of rotation with it; but the movements of the carriage $C^{11}$ are intermittent and intermittently retrograde, so that at each completion of its back-and-forth movement it rests in the same place.

The rail $C^{10}$, (see Fig. 3,) upon which the carriage $C^{11}$ makes its longitudinal motion, is moved back and forth in the line of rotation of the cylinder M by the following means: The levers $C^{12}$, to the upper end of which the rail $C^{10}$ is bolted, (see Figs. 3 and 5,) swing on the shaft $B^8$, to which they are loosely attached by housing $D^5$ and about which the cylinder M rotates. Motion is given to the lever $C^{12}$ by the cam $C'$, formed in the face of the wheel C, said cam $C'$ acting on a pin $C^2$ at the end of the arm $C^3$, which is attached to the rocker-shaft $C^4$, the rocker-shaft $C^4$ acting through the arm $C^5$, pivot $C^6$, link $C^7$, and pin $C^8$ in the said lever $C^{12}$. The wheel C (in which the cam $C'$ is formed) is loose on the shaft $B^8$ and is driven by the gear $B^{10}$ on the main shaft B, it revolving once while the main shaft revolves three times, and as the cylinder M revolves but once when the main shaft B revolves fifty-one times it will be manifest that the wheel C and its cam $C'$ revolves in relation to the cylinder M in the ratio of three to fifty-one—that is, as one to seventeen, seventeen being, as already stated, the number of facets (for receiving the moldings) on the main cylinder.

From the above it may be seen that the rail $C^{10}$ and the carriage $C^{11}$ upon it must be moved back and forth seventeen times in the time of one rotation of the cylinder M, for during the time that the cylinder M is making a seventeenth of its rotation the cam-wheel C will have made a full rotation, which full rotation, working through the cam $C'$, arms $C^3\ C^5$, and link $C^7$, will give the desired back-and-forth motion to the rail $C^{10}$.

The carriage $C^{11}$ receives its longitudinal motion on the rail $C^{10}$ by the following-described mechanism: $D^{17}$, Fig. 2, is a rope clamped at each end to the rear part $C^{13}$ of the carriage $C^{11}$, and, passing around the pulley $D^{18}$ at one end of the machine and the actuating-drum $D^{16}$ at the other end, acts as a transmitter for giving motion to the carriage, taking its own motion from the drum $D^{16}$. The drum $D^{16}$ has attached to it a beveled gear $D^{15}$, which engages with a beveled gear $D^{14}$, mounted on a shaft in the quill P, attached to the upper end of the lever $C^{12}$, Fig. 2. (See also Figs. 3, 4, and 5.) The shaft upon which the beveled gear $D^{14}$ is fastened at one end has at the other end a pinion $D^{13}$, close to the face of the lever $C^{12}$. (See Figs. 2 and 3.) The pinion $D^{13}$ engages with a pinion $D^{12}$ on a stud projecting from the face of the lever $C^{12}$; and is attached to a pinion $D^{11}$ on the same stud. The last-mentioned pinion $D^{11}$ engages with the reciprocatory segment-rack $D^{10}$. The movement of the segment-rack $D^{10}$ communicates motion through the train of gears just described to the drum $D^{16}$, and it in turn, acting through the rope $D^{17}$, moves the carriage $C^{11}$ longitudinally over the moldings $M^2$ on the facets $M'$ of the cylinder M. Reciprocatory motion is given to the segment-rack $D^{10}$ (see Fig. 5) by means of a cam $D'$, formed on the face of the wheel D, said wheel D being loose on the shaft $B^8$. The cam $D'$ gives motion through the pin $D^2$ to the lever $D^3$. The upper end of the said lever $D^3$ has a curved slot $D^7$, in which one end of the link $D^8$ is pivoted by a pin and nuts, as shown at $D^6$. The link $D^8$ is connected at $D^9$ (through the slot $d$) to the arm $d'$ of the segment-gear $D^{10}$. The arm $d'$ extends from the segment $D^{10}$ to the pivot-bolt $C^{16}$ on the lower end of the branch $C^{14}$ of the lever $C^{12}$, and the lever $D^3$ is attached at its lower end by a pivot-bolt $D^4$ to the lower end $C^{15}$ of the lever $C^{12}$. The cam-wheel D is driven by a gear (shown in dotted lines at $B^{12}$, Fig. 3) on the main shaft B, and it revolves but once while the cam-wheel C revolves twice. As the cam-groove $D'$, acting through the cam-piece $D^2$, lever $D^3$, and link $D^8$ gives motion to the segment-gear $D^{10}$, it will be seen that a full rotation of the said cam-groove D' takes place while the cylinder M is making two-seventeenths (of fifty-one) of its rotation, and it will be understood that the carriage $C^{11}$ will twice traverse the length of its longitudinal stroke—that is, once forth and once back—and that it in going forth takes one molding to work, and having gone to the end of it is moved over to the next molding (by the action of the cam C' and its levers and links, as has been heretofore explained) upon which it works in its return.

To clearly understand the motions of the carriage $C^{11}$ in relation to the motion of the molding being worked upon, we must bear in mind that having fixed upon the number of the moldings that are to be placed upon the cylinder M at one time the lateral movement of the carriage caused by the cam-wheel C and the longitudinal movement caused by the cam-wheel D must have a certain fixed number of movements.

In the present case we have adopted seventeen as the number of moldings to be placed upon the cylinder M at one time. Therefore our carriage $C^{11}$, to operate once on each molding, must traverse longitudinally seventeen times while the cylinder makes one rotation; but as the carriage works on one molding on its outward movement and another molding on its return movement, its completed forth-and-back movement will occupy the time that the cylinder M is making two-seventeenths of its rotation.

The reason for choosing an odd number of facets for the cylinder M is that it is necessary to go over the moldings a number of times to complete the work of polishing them, and in polishing it is desirable to change the direction of rubbing at each operation that is begun in turn at each end of the molding. By having an odd number of moldings on the cylinder it is evident that at each complete rotation the carriage will be found alternately at each end of the cylinder.

The lateral motion of the carriage $C^{11}$ takes place at each end of its longitudinal movement—that is, when the carriage has, following the molding in its rotatory motion, arrived at the end of the molding that is being polished. Then it will stop its longitudinal motion, as at this point the cams C' and D' and the cinematic chains of connection with the carriage are so arranged and constructed that there will be no motion of the lever $C^{12}$ in relation to the segment $D^{10}$. Therefore the pinion $D^{11}$ (see Fig. 5) will not rotate, and no longitudinal motion will be given to the carriage $C^{11}$; but as, in fact, the upper end of the lever $C^{12}$ now has a rearward motion, it will, acting through the rail $C^{10}$, take the carriage $C^{11}$ laterally over to the next molding, as has been explained. As soon as this lateral motion of the carriage has taken place the cams C' and D' in their continued rotation give a relative motion to the lever $C^{12}$ and the segment-gear $D^{10}$, which, acting through the train of gears $D^{11}$, &c., and drum $D^{16}$, give longitudinal motion to the carriage $C^{11}$.

We will now explain in detail the parts of the carriage $C^{11}$ and their operation, reference being made to Figs. 6, 7, and 8. The device that we have designated in general by the letter $C^{11}$ and called the "carriage" has attached to it the varnish-distributing devices and rubbing devices and such mechanism as are required for making these parts operative at the desired places. The carriage $C^{11}$ is held to the rail $C^{10}$ by the plates $c^3$ $c^3$, Figs. 7 and 8, said plates being a part of the frame of the carriage. The varnish-supply device consists of the flexible pipe $L^2$, Figs. 6 and 8, which leads from a suitable reservoir (not shown) and connects directly to the distributing-pipe L'. This pipe L' has a small nipple L, (see Fig. 6,) out of which the varnish is drawn by means of a blast of air under pressure issuing from the air-nipple $E^9$ on the pipe $E^7$, Fig. 6. The pipe L', Fig. 8, is held by a rod $E^5$, which is attached to the pipe $E^4$ by the clamps $E^6$ $E^6$, Figs. 6, 7, and 8, said pipe $E^4$ being attached to the swinging frame $E^8$ by the clamps $E^7$ $E^7$. Motion is given to the swinging frame $E^8$ by means of the gear-wheel $F^2$, the teeth of which engage with a rack on the under side of the fixed rail $C^{10}$, so that as the carriage $C^{11}$ traverses along the rail the wheel $F^2$ rotates, and acting, through the shaft $F^3$, the crank-disk $F^4$, pin $F^5$, link $F^{14}$, and arm $F^{15}$, actuates the frame $E^8$ and causes the ends of the discharge-nipples L $E^9$ to vibrate laterally over the molding being polished, so as to distribute the varnish evenly over the whole surface. In the drawings, Figs. 6 and 7, it will be seen that we have two sets of varnish-distributing devices, one at each side of the carriage $C^{11}$. This is necessary, as our device operates over the surface of the moldings in both of its passages from one end of the cylinder to the other; but the varnish-distributing must always be done in front of the rubbers—that is, the rubbing of the varnish follows its distribution in both the outward and inward passage of the carriage. To secure this result, we have the following device: The tank or reservoir that supplies the pipes $L^2$ with varnish is of about the same height as the nipples L, so that no varnish will pass out of them unless it is drawn out by the force of the blast of air from the air-nipples $E^9$. This air-blast is working only in the nipple that is in front of the rubbers for the time being—that is, when the carriage is moving in a certain direction—so that there is no blast from the nipple that follows the rubbers, and hence there is no varnish distributed except by the nipple L, that is for the time being in front of the rubbers. Thus if the carriage is moving to the right, (see Fig. 6,) then the nipple on the right-hand tube L' would be distributing varnish and the tube L' on the left would cease to deliver, and vice versa.

The device that we use for turning the air-blast from one side of the carriage to the other is as follows: The air-pipes E⁴ E⁴ are connected by flexible tubes E³ E³ to the valve-casing E² E², (see Figs. 6 and 8,) the casings E² E² being attached to the ends of a lever E, and also are in connection with an air-tube E', Fig. 6, the said air-tube E' being connected to a supply-pipe S, Fig. 8, through which air under pressure is constantly supplied. The swinging lever E is pivoted at the center, so that it may swing in a horizontal plane in such a manner that it may place either of the valve-casings E² E² at its ends under the arm e' e'. Each of the valve-casings E² E² contains a self-closing valve that is adapted to close upward, and, when closed, to prevent the flow of air through its valve-casing. These valves are closed by a spring, (not shown,) which forces them upward against their respective seats, and are opened alternately by the action of the arms e' e', as will be described. A swinging motion is given to the swinging lever E by means of fixed cam-pieces E¹⁶ E¹⁶, Figs. 1 and 2, on the frame of the machine, which are so made and placed that at each passage of the carriage it, at the end of its path, will cause the end of the swinging lever E to come in contact with it and be pushed over, so that the valve-casing E² of that end (say at the right of Figs. 6 and 7) of the swinging lever will pass out from under the arm e', and at the same time cause the valve in E² at the left to pass under the left arm e', and to be in position to be acted upon—that is, opened by it.

The valves in E² E² are alternately closed and opened by the movements of the piece e' e', the motion of which, in connection with the rubbing device to which they are attached, will now be explained.

H⁸ and K², Figs. 6 and 7, represent two sliding frames affixed by way-pieces K³ K³ K³ K³, Fig. 6, to the carriage C¹¹ in such a manner that they are free to slide up and down, the downward motion being limited, when not in use, by a projection extending rearward, one of which is shown at h, Fig. 8. In each of the sliding frames H⁸ and K² we have a sliding rod H⁵, or, as the case may be, K⁶. The sliding rod H⁵ has its upper end loosely held in the upper projecting arm H⁷ and its lower end in a plate c⁴, Figs. 6 and 7, which can slide in and out on the lower arm H⁷, a slot being made in this arm for the rod H⁵ to oscillate in. A spring H⁶, Fig. 6, one end of which is attached to the rod H⁵ and the other to some convenient part of the frame of the carriage C¹¹, draws diagonally, so that it acts to pull the rod H⁵ downwardly and in toward the carriage C¹¹ at the same time. The sliding rod K⁶ is made like the rod H⁵, but has no oscillating motion, its motion being up and down only, as its function is to polish the flat horizontal surface of the moldings, a tendency to a downward motion being given it by a spring K⁷, surrounding the rod K⁶. To the lower ends of the rods H⁵ and K⁶ are attached pad-holding clamps, each having arms H² H' H', adapted to hold the rubbing-pads H and K. (See Fig. 6.) The rubbing-pads H and K may be of any desired material and their rubbing-surfaces may be of any desired shape to fit the molding to which they are to be applied. The sliding frames H⁸ and K², to which the pad-rods H⁵ and K⁶ are connected, are made to slide up, taking the pads with them, for the purpose of preventing the pads injuring the ends of the moldings as they pass off from them. When the carriage C¹¹ has arrived at the end of its passage in either direction, the slides and pads are held up until the carriage in its return has moved so far as to bring the pads again over the end of the next molding to be worked, when they are allowed to move down to the molding and to again work. The device for raising and lowering the pads and their holders consists of cam-pieces V V', Fig. 1, which, as the carriage C¹¹ approaches the end of its stroke, engage with pins or rollers T² T², Fig. 6, on the sliding pieces H⁸ K² and lift them up off from the work. The rubber H is made to swing outwardly by means of cam-pieces T' T', (see Fig. 1,) which come in contact with the plate c⁴ on the arm H⁷, and in sliding it outward cause the rod H⁵ and its pad H to swing out and away from the edge of the molding.

The cam-pieces E¹⁶, V', and T' are all attached to blocks T, one at each end of the machine. These blocks are adjustable on the rail C¹⁰, so that they may be set for each length of molding that it is desired to work.

Now, returning to the valve-casings E² E², Figs. 6, 7, and 8, and the pieces e' e', we can understand their action, for said pieces e' e' being attached to the sliding pieces H⁶ K², and, as we have seen, the sliding pieces move up and down at the end of each passage of the carriage, (by the action of the cam-pieces V,) it is obvious that the pieces e' e' will also move up and down, and in moving down will cause the valve-stem e of the valve-casing E² that is under them to be pressed down and thus open its valve and allow a blast of air to enter the tube E³, and thence to the nipple E⁹, and thus start a flow of varnish on to the molding to be polished. Remembering that only one of the valve-casings E² can be in position to be acted upon by either of the pieces e', and that one is the one that precedes the rubbers, it is obvious that varnish can only flow through the nipple E⁹ that in motion precedes the carriage and the rubbers.

The shape, motions, and number of the rubbing-pads may be varied to suit the work to be done.

For convenience in placing the moldings onto the cylinder M, we have the following device: W, Figs. 1 and 3, is a foot-lever affixed to a rocker-shaft W', upon which shaft an arm W² extends, so as to make a loose connection by a pin W³ with an arm W⁴ extending from a second rocker-shaft W⁵.

From this second rocker-shaft $W^5$ a number of supporting-arms $W^6$ extend upward, and have attached to them adjustable guide-pieces like $W^7$ $W^8$ for supporting the molding before it is placed onto its facet on the cylinder. By this arrangement the molding, after having been placed on the arms $W^6$, may by simply depressing the foot-lever W, be accurately moved and adjusted to its exact place on the facet of the cylinder M, ready to be secured to its place by the device shown in Figs. 4 and $4^a$ already described.

To hold the cylinder M in position while placing the moldings, we have a locating-lever R, the lower end of which is pivoted at $R^2$, Fig. 4, its upper end being forked, as shown at R', Fig. 4, and adapted to embrace one of the shafts $M^3$. (See Figs. 1, 2, and 4.)

To use our machine, we proceed as follows: The cylinder M is set free from the main shaft B by removing the pin b', Fig. 4, from the disk $B^9$. Now the cylinder is turned by hand until one of the shafts $M^3$ comes opposite the fork of the locating-lever R. The lever is then pushed forward until it engages with the shaft, and thus holds the cylinder M in such a position that one of its facets M' will be exactly opposite to the molding that has been previously placed between the guide-pieces $W^7$ and $W^8$ of the lever $W^6$. Now the operator by depressing the foot-lever W forces the molding against the facet of the cylinder and in contact with the points of the screws $M^6$. Then by turning the proper shaft $M^3$, the molding will be secured onto its facet. The cylinder is now turned so as to bring the next facet into place, and a repetition of above-described operations will affix another molding. These operations may be continued until all of the facets of the cylinder have moldings affixed to them. Now by reinserting the pin b' the cylinder M will be reconnected to the main shaft. The next operation is to adjust the cam-blocks T T on the rail $C^{10}$, so that the pad-holders will be lifted and dropped at the right time and otherwise moved into and out of working position. This having been done, the pad-holders can be adjusted to the proper height by means of the thumb-screws $H^9$ and $K^7$. The lateral rubbing-pad H can be adjusted by moving the plate $c^3$ and fastening it in the desired position by the clamping-screw $c^5$. (See Fig. 8.) The pad-holders should be so adjusted and shaped that they will bear with an even firm pressure on all parts of the moldings. It only remains for the operator to see that his varnish-reservoir is full, and that the varnish-supply pipes and nipples are in good order, and that pressure requisite for a good blast of air is on the air-pipes, and the machine may be started.

The relative motions and degree of motion of the several parts may be briefly stated as follows: Suppose the carriage $C^{11}$ to begin its passage at the right as we view the machine in Figs. 1, 2, and 3, and passes to the left. By the time that either of the pads reach the end of the moldings they must have begun the motion of part rotation about the axis of the cylinder M, so as to keep always on the molding—that is, rotating with the said cylinder—and while the moldings are rotating three-fourths of the distance apart or three-fourths of one-seventeenth, equal to three-sixty-eighths of a whole rotation, the carriage having the pads will have traveled the whole length of the molding, and the driving-shaft B will have rotated two and one-fourth times. The gear-wheel C, with its cam-groove C', which operates the levers $C^3$ $C^5$, links $C^7$, and through them the carriage-rail $C^{10}$, thus causing the pads to keep with the moldings, will have revolved three-fourths of a rotation. The gear-wheel D, with its cam-groove D', will, acting through its transmitting mechanism, cause the carriage $C^{11}$ and the pads to move longitudinally along the moldings, its motion being three-eighths of a rotation. When the moldings have rotated the remaining one-fourth ($\frac{1}{4}$) of their distance apart, or one-fourth of one-seventeenth, equal to one-sixty-eighth of a complete rotation, they will have made one-seventeenth of a whole rotation. The pads will have been returned by the rearward action of the upper end of the lever $C^{12}$, as already explained, back to the original line, and be in a position corresponding to that in which they started at the other end and ready to move from left to right. The driving-shaft B having made three rotations, the gear-wheel C has made one, and the gear-wheel D one-half of a motion, thus completing the operation of laying and polishing one coat of varnish. That is all the work that is done on the molding until the cylinder M makes a full rotation. Then the work on that molding is repeated, and so on until sufficient number of layers are applied and polished.

I claim—

1. In a machine for varnishing and polishing moldings, a revolving cylinder M, having longitudinal facets M', each of which is provided with sets of clamping-screws adapted to be turned simultaneously by means of a longitudinal shaft, so as to engage with and securely hold their respective molding, substantially as and for the purpose set forth.

2. In a machine for varnishing and polishing moldings, a revolving cylinder M, having longitudinal facets M' for holding moldings, a rail $C^{10}$, having a partial rotating motion about the axis of the cylinder M, transmitting-carriage $C^{11}$, moving on said rail, having self-acting varnish distributing and rubbing devices, substantially as and for the purpose set forth.

3. In a machine for varnishing and polishing moldings, a continuously-rotating cylinder M, adapted to hold moldings for being varnished and polished, a carriage-rail $C^{10}$, parallel to and near the surface of said cylinder, having a partial rotating motion about the axis of the cylinder M, and an automatically-moving carriage $C^{11}$, located on said rail, provided with an automatic device for distributing varnish onto the moldings as presented by the cylinder, substantially as and for the purpose set forth.

4. In a machine for varnishing and polishing moldings, a continuously-rotating cylinder M, adapted to hold molding for being polished, a carriage-rail $C^{10}$, parallel to and near the surface of said cylinder, having a partial rotating motion about the axis of the cylinder M, and a carriage $C^{11}$, moving on said rail, provided with an automatic device for polishing the moldings presented by the cylinder, substantially as and for the purpose set forth.

5. In a machine for varnishing and polishing moldings, the cylinder M, adapted to hold and present moldings to the action of the varnishing and polishing devices, as described, the locating-lever R R', attached to the frame of the machine and provided with a fork at its upper end, said fork adapted to engage with one of the shafts $M^3$, and the molding-receiving levers $W^6 W^6$, adapted to operate as described, substantially as and for the purpose set forth.

6. In a machine for varnishing and polishing moldings, a continuously-rotating cylinder M, a partially-rotating rail $C^{10}$, parallel to and near the surface of said cylinder, having at its ends adjustable head-blocks T, provided with fixed cam-pieces V V', adapted to operate upon the rubbing-pads H K, attached to the carriage $C^{11}$, and the carriage $C^{11}$, substantially as and for the purpose set forth.

7. In a machine for varnishing and polishing moldings, a continuously-rotating cylinder M, a partially-rotating rail $C^{10}$, parallel to and near the surface of the said cylinder M, having at its ends adjustable head-blocks T T, provided with fixed cam-pieces T T', adapted to move the rubber H in a lateral direction, substantially as and for the purpose set forth.

8. In a machine for varnishing and polishing moldings, the traversing carriage $C^{11}$, having air-pipes $E^4$, provided with valve-casings and valves $E^2$, adapted to be automatically oscillated and opened for the admission of air as required, fixed cams $E^{16}$ at the end of the rail $C^{10}$, adapted to open said valves $E^2$, substantially as described, and for the purpose set forth.

In testimony whereof we have signed our names to this specification in the presence of two subscribing witnesses on this 20th day of May, A. D. 1889.

JOHN W. HUSSEY.
ERASTUS WOODWARD.

Witnesses:
FRANK G. PARKER,
MATTHEW M. BLUNT.